United States Patent
Seong et al.

(10) Patent No.: US 9,887,399 B2
(45) Date of Patent: Feb. 6, 2018

(54) BATTERY MODULE WITH ENHANCED VIBRATION CHARACTERISTIC AND FRAME CARTRIDGE ASSEMBLY APPLIED FOR THE SAME

(71) Applicant: LG CHEM, LTD., Seoul (KR)

(72) Inventors: Jun-Yeob Seong, Daejeon (KR); Bum-Hyun Lee, Daejeon (KR); Dal-Mo Kang, Daejeon (KR); Jung-Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 154 days.

(21) Appl. No.: 14/421,286

(22) PCT Filed: Aug. 22, 2014

(86) PCT No.: PCT/KR2014/007839
§ 371 (c)(1),
(2) Date: Feb. 12, 2015

(87) PCT Pub. No.: WO2015/060528
PCT Pub. Date: Apr. 30, 2015

(65) Prior Publication Data
US 2016/0036017 A1    Feb. 4, 2016

(30) Foreign Application Priority Data
Oct. 23, 2013    (KR) .......................... 10-2013-0126757

(51) Int. Cl.
*H01M 2/10*    (2006.01)
*H01M 2/02*    (2006.01)

(52) U.S. Cl.
CPC ......... *H01M 2/1061* (2013.01); *H01M 2/021* (2013.01); *H01M 2/0207* (2013.01); *H01M 2/0275* (2013.01); *H01M 2/1077* (2013.01)

(58) Field of Classification Search
CPC ............ H01M 2/1061; H01M 2/1077; H01M 2/0207; H01M 2/02; H01M 2/021;
(Continued)

(56) References Cited

U.S. PATENT DOCUMENTS 5,354,968 A * 10/1994 Yamamura ................ F23Q 7/16
219/267
8,709,644 B2    4/2014 Maguire et al.
(Continued)

FOREIGN PATENT DOCUMENTS

CN    101933176 A    12/2010
CN    103081175 A    5/2013
(Continued)

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

A battery module according to an exemplary embodiment of the present disclosure includes at least one battery cell including a cell body and an electrode lead extending from the cell body, a frame cartridge to receive the battery cell in a manner of surrounding a circumference of the battery cell, the frame cartridge having a cell mounting part where the cell body is mounted, and a cell support member interposed between the cell mounting part and the cell body.

According to the present disclosure, damage to components caused by vibration may be prevented by suppressing the movement of the battery cell within the frame cartridge, while maintaining convenient assembling performance of the frame cartridge and the battery cell.

20 Claims, 10 Drawing Sheets

(58) Field of Classification Search
CPC .. H01M 2/0212; H01M 2/0217; H01M 2/022; H01M 2/024; H01M 2/0275
See application file for complete search history.

(56) References Cited

U.S. PATENT DOCUMENTS

| | | |
|---|---|---|
| 8,822,052 B2 | 9/2014 | Yang et al. |
| 2003/0152826 A1* | 8/2003 | Matsuzawa ........... H01M 2/204 429/100 |
| 2007/0207377 A1* | 9/2007 | Han ....................... H01M 2/021 429/162 |
| 2010/0196749 A1 | 8/2010 | Yoshida et al. |
| 2011/0318623 A1 | 12/2011 | Lee et al. |
| 2012/0177952 A1* | 7/2012 | Maguire ............. H01M 2/1077 429/1 |
| 2013/0059171 A1 | 3/2013 | Kim et al. |
| 2013/0149577 A1 | 6/2013 | Lee et al. |

FOREIGN PATENT DOCUMENTS

| | | |
|---|---|---|
| EP | 2408042 A1 | 1/2012 |
| JP | 2008-103239 A | 5/2008 |
| JP | 2009-158281 A | 7/2009 |
| KR | 10-2010-0047907 A | 5/2010 |
| KR | 10-2013-0025165 A | 3/2013 |
| KR | 10-2013-0051035 A | 5/2013 |

\* cited by examiner

BATTERY MODULE WITH ENHANCED VIBRATION CHARACTERISTIC AND FRAME CARTRIDGE ASSEMBLY APPLIED FOR THE SAME

TECHNICAL FIELD

The present disclosure relates to a battery module with improved vibration characteristic and a frame cartridge assembly applied for the same, and more particularly, to a battery module having a structure equipped with a fixing member for preventing vibration at a part of a cartridge coming into contact with a battery cell and a frame cartridge assembly applied for the same.

The present application claims priority to Korean Patent Application No. 10-2013-0126757 filed in the Republic of Korea on Oct. 23, 2013, the disclosures of which are incorporated herein by reference.

BACKGROUND ART

Conventionally, in a battery module in which a battery cell is confined using a cartridge, generally a movement of the battery cell was confined by applying pressure in a surface direction of the battery cell.

This type of battery module may be manufactured by molding the cartridge such that the cartridge fixes a corner of a body of the battery cell, but to insert the battery cell into the cartridge, a tolerance for assembling between the battery cell and the cartridge molding product needs to be considered.

If design is made without considering the tolerance, that is, a predetermined distance between the cartridge and the battery cell, it is impossible to assemble according to characteristics of the cartridge molding product that an entire shape hardly change.

For this reason, at least a predetermined level of gap between the battery cell and the cartridge is required, but consequently, the corner of the body of the battery cell accurately fixed onto the inside surface of the cartridge, and a predetermined width of movement may be generated due to vibration that may occur during use of the battery module.

The movement of the battery cell may cause damage to an electrode lead connection part, resulting in entire quality reduction of the battery module, and accordingly, there is an urgent need of a solution to the problem.

DISCLOSURE

Technical Problem

The present disclosure is designed to solve the above problem, and therefore, the present disclosure is directed to providing a cartridge-type battery module which prevents damage to components caused by vibration that may occur during use of the battery module by limiting the movement of a battery cell while maintaining convenience in assembling the battery cell and the cartridge.

However, the object of the present disclosure is not limited to the above object, and other objects of the present disclosure will become apparent to those skilled in the art from the following description.

Technical Solution

To achieve the above object, a battery module according to an exemplary embodiment of the present disclosure includes at least one battery cell including a cell body and an electrode lead extending from the cell body, a frame cartridge to receive the battery cell in a manner of surrounding a circumference of the battery cell, the frame cartridge having a cell mounting part where the cell body is mounted, and a cell support member interposed between the cell mounting part and the cell body.

The cell body may include an electrode assembly, and a pouch case to receive the electrode assembly while the electrode lead is drawn outside.

The frame cartridge may have a lead mounting part where the electrode lead is mounted.

The cell support member may be provided plurally and spaced away from each other along a direction in which the cell mounting part extends.

The cell support member may be integratedly formed with the frame cartridge by insert molding.

The cell support member may be made of silicon.

The cell support member may be of a circular shape, an oval shape, or a rectangular shape.

The cell support member may have an 'S' shape or a repeatedly extending 'S' shape.

Meanwhile, the above object may be also achieved by a frame cartridge assembly according to an exemplary embodiment of the present disclosure employed in the battery module, and the frame cartridge assembly according to an exemplary embodiment of the present disclosure includes a frame cartridge to receive a battery cell in a manner of surrounding a circumference of the battery cell, the frame cartridge having a cell mounting part where the battery cell is mounted, and a cell support member fixed to the frame cartridge and interposed between the cell mounting part and the cell body.

The battery cell may include a cell body including an electrode assembly and a pouch case to receive the electrode assembly, and an electrode lead connected with the electrode assembly and drawn out of the pouch case.

The frame cartridge may have a lead mounting part where the electrode lead is mounted.

The cell support member may be provided plurally and spaced away from each other along a direction in which the cell mounting part extends.

The cell support member may be integratedly formed with the frame cartridge by insert molding.

The cell support member may be made of silicon.

The cell support member may be of a circular shape, an oval shape, or a rectangular shape.

The cell support member may have an 'S' shape or a repeatedly extending 'S' shape.

Advantageous Effects

According to the present disclosure, damage to components caused by vibration may be prevented by suppressing the movement of a battery cell within a frame cartridge, while maintaining convenient assembling performance of the frame cartridge and the battery cell.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A battery module 100 according to an exemplary embodiment of the present disclosure is described with reference to FIGS. 1 through 5.

Figure 1:
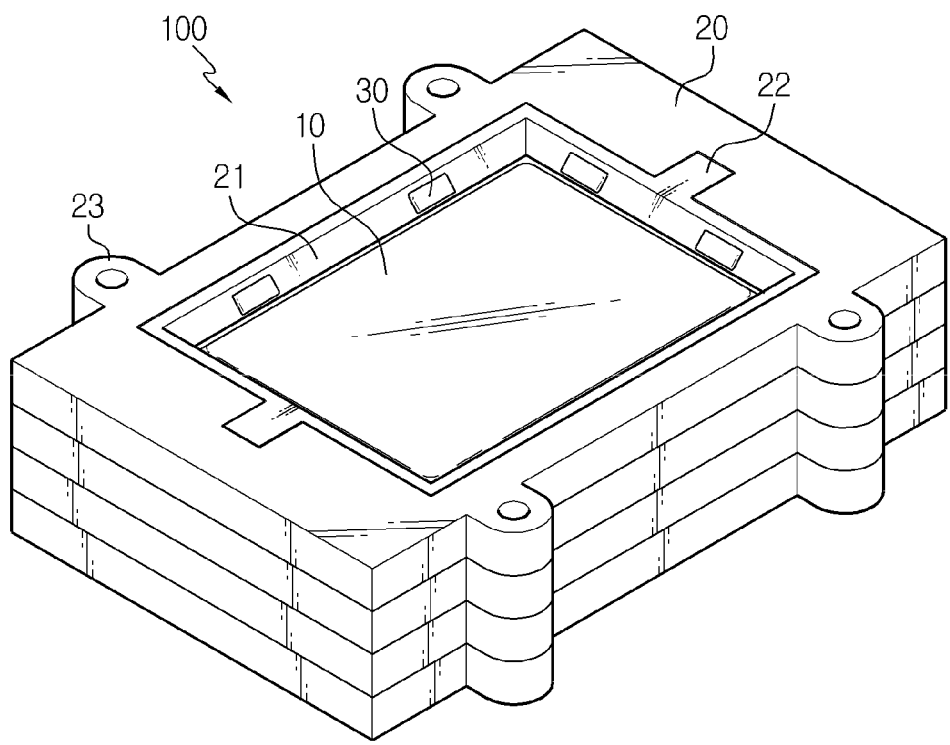
FIG. 1 is a perspective view illustrating a battery module according to an exemplary embodiment of the present disclosure.
Figure 2:
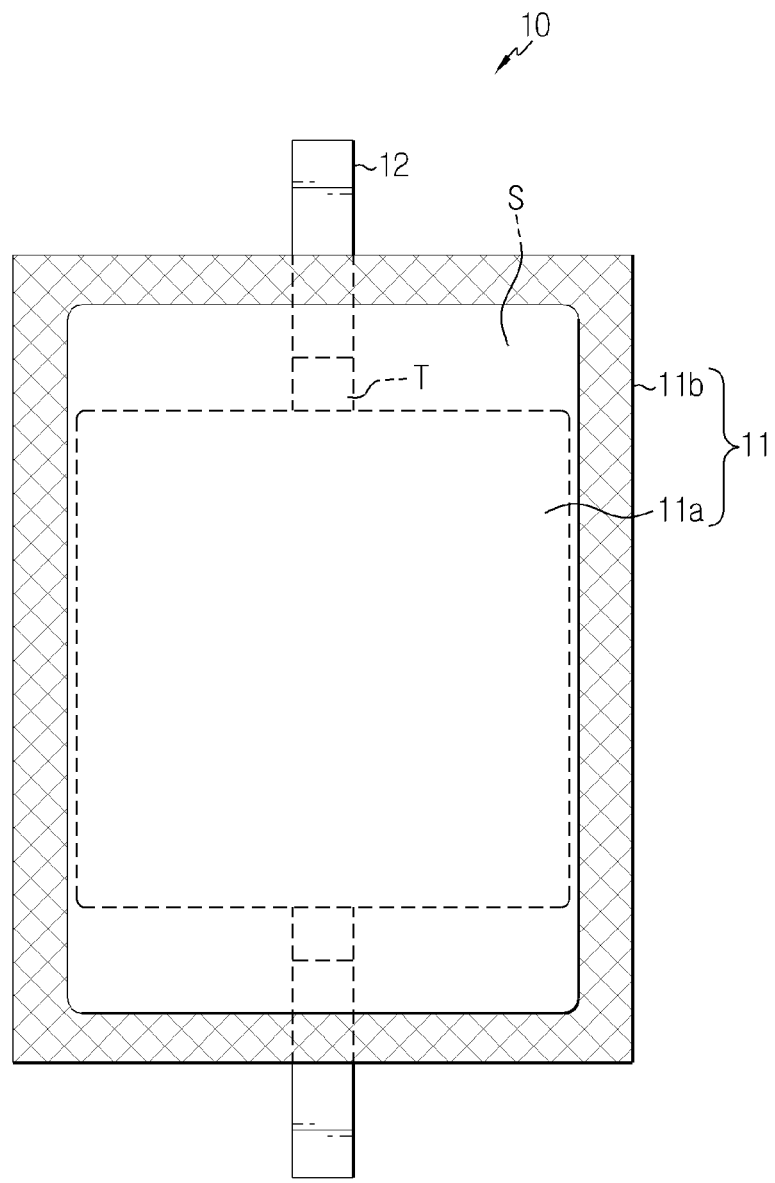
FIG. 2 is a plane view illustrating a battery cell shown in FIG. 1.
Figure 3:
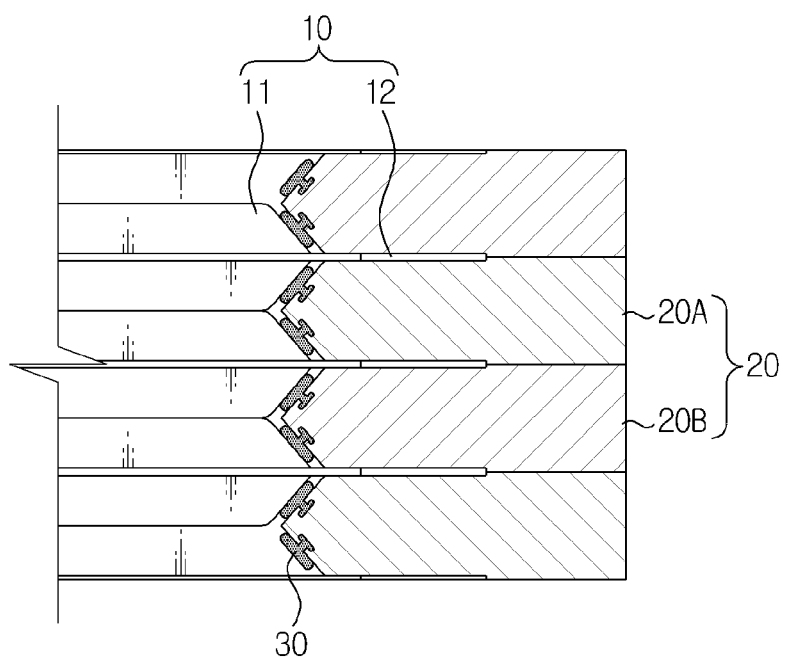
FIG. 3 is a partial cross-sectional view illustrating an internal structure of the battery module shown in FIG. 1.
Figure 4:
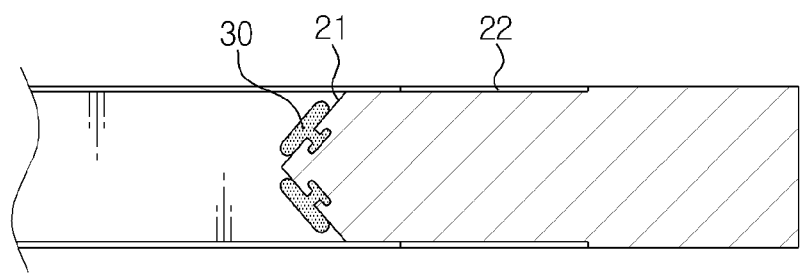
FIG. 4 is a partial cross-sectional view illustrating a frame cartridge and a cell support member shown in FIG. 2.
Figure 5:
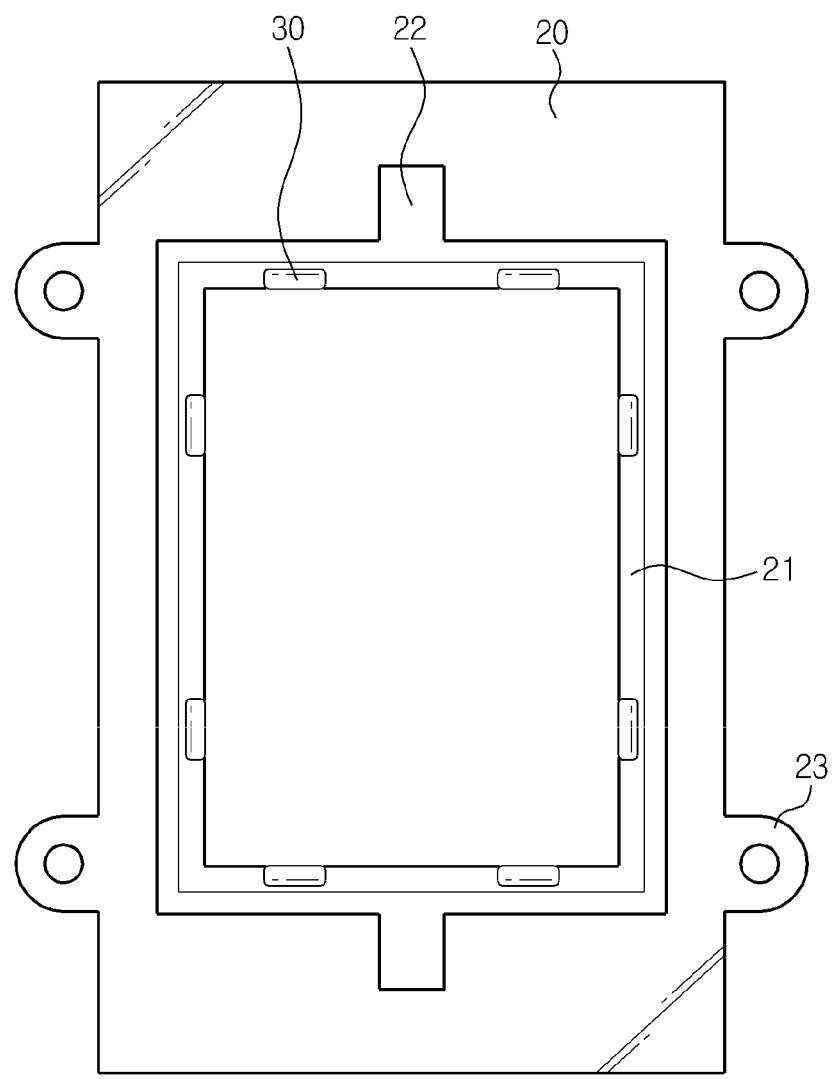
FIG. 5 is a plane view illustrating a frame cartridge and a cell support member shown in FIG. 2.
Figure 6:
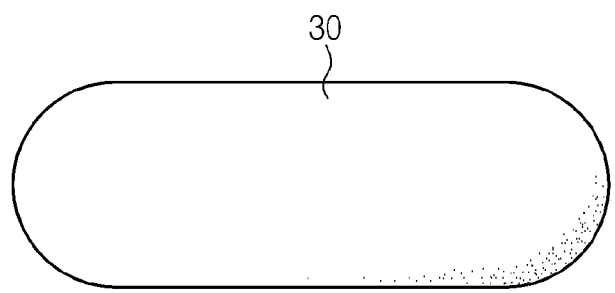
FIGS. 6 through 10 are diagrams illustrating various shapes of the cell support member shown in FIG. 4.
Figure 7:
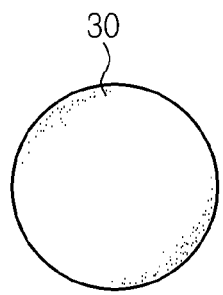
Figure 8:
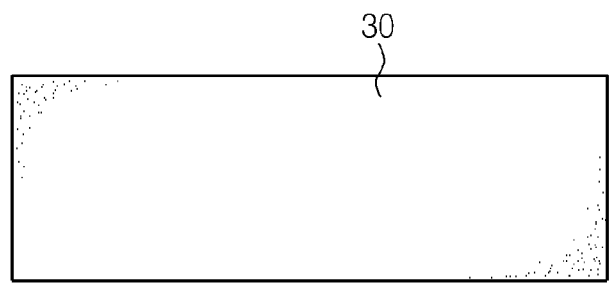

FIG. 1 is a perspective view illustrating the battery module according to an exemplary embodiment of the present disclosure, FIG. 2 is a plane view illustrating a battery cell shown in FIG. 1, and FIG. 3 is a partial cross-sectional view illustrating an internal structure of the battery module shown in FIG. 1. Also, FIG. 4 is a partial cross-sectional view illustrating a frame cartridge and a cell support member shown in FIG. 2, and FIG. 5 is a plane view illustrating the frame cartridge and the cell support member shown in FIG. 2.

First, referring to FIGS. 1 and 2, the battery module 100 according to an exemplary embodiment of the present disclosure includes a battery cell 10, a frame cartridge 20, and a cell support member 30.

The battery cell 10 is a pouch-type battery cell, and includes a cell body 11 and an electrode lead 12. Also, the cell body 11 includes an electrode assembly 11a and a pouch case 11b which receives the electrode assembly 11a.

The electrode assembly 11a includes a cathode plate, an anode plate, a separator (not shown), and an electrode tab T. The electrode assembly 11a may be a stack-type electrode assembly formed by stacking the cathode plate and the anode plate with the separator interposed therebetween. However, the electrode assembly 11a is not limited to a stack type, and it is possible to form in a jelly-roll type.

The electrode tab T is integratedly formed with the electrode plate, namely, the cathode plate or the anode plate, and corresponds to a non-coating area, or an area not coated with an electrode active material among the electrode plate. That is, the electrode tab T includes a cathode tab corresponding to an area not coated with a cathode active material among the cathode plate and an anode tab corresponding to an area not coated with an anode active material among the anode plate.

The pouch case 11b is sealed by joining a circumferential area by heat fusion, to receive the electrode assembly 11a therein while the electrode lead 12 is drawn outside.

The pouch case 11b may have a multilayered structure to ensure an excellent heat fusible property, rigidity sufficient to maintain a shape and protect the electrode assembly 11a, and an insulating property. For example, the pouch case 11b may have a multilayered structure including a first layer disposed at the innermost side and facing the electrode assembly 11a, a second layer disposed at the outermost side and exposed directly to the external environment, and a third layer (not shown) interposed between the two layers.

In this case, as an example, the first layer may be made of a material having an anti-corrosion property against an electrolyte solution, an insulating property and a heat fusible property, for example, polypropylene (PP), the second layer may be made of a material having rigidity enough to maintain a shape and an insulating property, for example, polyethylene terephthalate (PET), and the third layer may be made of a metal material, for example, aluminum (Al).

The electrode lead 12 is a thin plate-like metal, and is attached to the electrode tab T and extends outward from the cell body 11. The electrode lead 12 includes a cathode tab connected with the cathode lead and an anode lead connected with the anode tab.

Subsequently, referring to FIG. 3, the frame cartridge 20 has a shape of a frame with an empty space at the center, and receives the battery cell 10 in a manner of surrounding the circumference of the battery cell 10.

The frame cartridge 20 includes a cell mounting part 21 where the cell body 11 is mounted and a lead mounting part 22 where the electrode lead is mounted, so that the battery cell 10 may be stably fixed.

When viewing from a particular battery cell 10, the frame cartridge 20 may include a first frame cartridge 20A disposed on the battery cell 10 and a second frame cartridge 20B disposed beneath the battery cell 10.

That is, the pair of frame cartridges 20A and 20B is each disposed on and beneath the battery cell 10 in close contact with the battery cell 10 so that the battery cell 10 may be fixed.

Also, the frame cartridge 20 has a fixing part 23 into which a fixed axis such as a bolt may be inserted. Thus, by coupling the fixing part 23 equipped in each of the frame cartridges 20A and 20B disposed above and below using the fixed axis, the battery cell 10 may be fixed between the pair of frame cartridges 20A and 20B.

Subsequently, referring to FIGS. 3 through 5, the cell support member 30 is interposed between the cell mounting part 21 of the frame cartridge 20 and the cell body 11 of the battery cell 10. The cell support member 30 is made of a material having elasticity, for example, silicon, thereby preventing the buttery cell 10 from being damaged while minimizing a gap that may be generated between the cell body 11 and the cell mounting part 21.

That is, because the empty space S (see FIG. 2) formed between the circumferential area of the pouch case 11b and the electrode assembly 11a is disposed over an area facing the cell mounting part 21 among the cell body 11, when vibration occurs during use of the battery module 100, the battery cell 10 moves within the frame cartridge 20.

The movement of the battery cell 10 causes a poor connection of the electrode lead 12, resulting in product quality reduction, and this phenomenon may be prevented by installing the cell support member 30 having elasticity between the battery cell 10 and the frame cartridge 20.

Referring to FIG. 4, the cell support member 30 may be implemented in a manner of being fixed to the frame cartridge 20 such that a portion of the cell support member 30 is inserted into the frame cartridge 20, to stably fix the battery cell 10.

Particularly, when the cell support member 30 is integratedly formed with the frame cartridge 20 by insert molding, there is an effect of improving productivity of a frame cartridge assembly with an excellent ability to fix the battery cell 10.

Also, referring to FIG. 5, the cell support member 30 may be provided plurally, and may spaced away from each other along a direction in which the cell mounting part 21 of the frame cartridge 20 extends.

Figure 9:
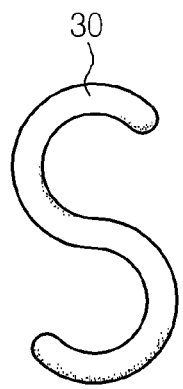
Figure 10:
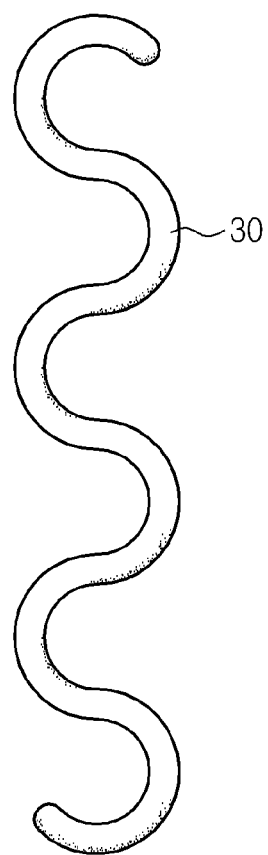

Referring to FIGS. 6 through 10, the cell support member 30 may have various shapes, for example, an oval shape (see FIG. 6), a circular shape (see FIG. 7), a rectangular shape (see FIG. 8), and an 'S' shape (see FIG. 9). Particularly, when the cell support member 30 has an 'S' shape, the support performance may be maximized while minimizing an area coming into contact with the battery cell 10, and as shown in FIG. 10, when the cell support member 30 has a repeatedly extending 'S' shape, that is, a repeating pattern of ridges and furrows, it may be more advantageous in terms of support performance.

As described in the foregoing, the battery module 100 according to an exemplary embodiment of the present disclosure has a structure of minimizing the movement of the battery cell 10 using the frame cartridge assembly implemented by installing the cell support member 30 in the frame cartridge 20, leading to excellent vibration characteristic.

Also, due to the excellent vibration characteristic, the battery module 100 according to an exemplary embodiment of the present disclosure may prevent a poor connection of the battery cell 10 during use of the battery module 100 and consequently prevent the production of faulty products.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module comprising:
   at least one battery cell including a cell body and an electrode lead extending from the cell body;
   a frame cartridge to receive the battery cell in a manner of surrounding a circumference of the battery cell, the frame cartridge having a cell mounting surface where the cell body is mounted;
   a groove formed in the cell mounting surface; and
   at least one cell support member interposed between the cell mounting surface and the cell body, the at least one cell support member having an extension extending into the groove and a main section contacting the cell mounting surface,
   wherein the groove and extension each have a T-shaped cross section.

2. The battery module according to claim 1, wherein the cell body comprises:
   an electrode assembly; and
   a pouch case to receive the electrode assembly while the electrode lead is drawn outside.

3. The battery module according to claim 1, wherein the frame cartridge has a lead mounting part where the electrode lead is mounted.

4. The battery module according to claim 1, wherein the at least one cell support member is a plurality of cell support members spaced away from each other along a direction in which the cell mounting surface extends.

5. The battery module according to claim 1, wherein the at least one cell support member is integrally formed with the frame cartridge by insert molding.

6. The battery module according to claim 1, wherein the at least one cell support member is made of silicon.

7. The battery module according to claim 1, wherein the at least one cell support member is of a circular shape, an oval shape, or a rectangular shape.

8. The battery module according to claim 1, wherein the at least one cell support member has an 'S' shape or a repeatedly extending 'S' shape.

9. A frame cartridge assembly comprising:
   a frame cartridge to receive a battery cell in a manner of surrounding a circumference of the battery cell, the frame cartridge comprising:
      a top surface and a bottom surface;
      a central aperture, an edge of the central aperture formed by a cell mounting surface where the battery cell is mounted, the cell mounting surface comprising an inclined upper surface extending from the top surface of the frame cartridge and an inclined lower surface extending from the bottom surface of the frame cartridge; and
      at least one groove formed in the cell mounting surface;
   at least one cell support member fixed to the frame cartridge and interposed between the cell mounting surface and the cell body, the at least one cell support member having an extension extending into the groove and a main section contacting the cell mounting surface; and
   a battery cell retained in the central aperture of the frame cartridge.

10. The frame cartridge assembly according to claim 9, wherein the battery cell comprises:
    a cell body including an electrode assembly and a pouch case to receive the electrode assembly; and
    an electrode lead connected with the electrode assembly and drawn out of the pouch case.

11. The frame cartridge assembly according to claim 10, wherein the frame cartridge has a lead mounting part where the electrode lead is mounted, the lead mounting part being a recess in the top surface of the frame cartridge.

12. The frame cartridge assembly according to claim 9, wherein the at least one cell support member is a plurality of cell support members spaced away from each other along a direction in which the cell mounting surface extends.

13. The frame cartridge assembly according to claim 9, wherein the at least one cell support member is integrally formed with the frame cartridge by insert molding.

14. The frame cartridge assembly according to claim 9, wherein the at least one cell support member is of a circular shape, an oval shape, or a rectangular shape.

15. The frame cartridge assembly according to claim 9, wherein the at least one cell support member has an 'S' shape or a repeatedly extending 'S' shape.

16. The frame cartridge assembly according to claim 9, wherein the groove and extension are each T-shaped.

17. The frame cartridge assembly according to claim 9, wherein the at least one groove formed in the cell mounting surface comprises a first groove in the upper surface and a second groove in the lower surface, each groove having a cell support member.

18. The frame cartridge assembly according to claim 9, wherein the battery cell has an inclined upper surface extending from a top surface of the cell and an inclined lower surface extending from a bottom surface of the cell, and wherein the inclined lower surface of the cell contacts the inclined upper surface of the frame cartridge.

19. A frame cartridge assembly comprising:

a plurality of frame cartridges, each frame cartridge comprising:

a top surface and a bottom surface;

a central aperture, an edge of the central aperture formed by a cell mounting surface, the cell mounting surface comprising an inclined upper surface extending from the top surface of the frame cartridge and an inclined lower surface extending from the bottom surface of the frame cartridge; and an upper cell support member fixed to the inclined upper surface and a lower cell support member fixed to the inclined lower surface; and at least one battery cell supported by the plurality of frame cartridges;

wherein the at least one battery cell has an inclined upper surface extending from a top surface of the at least one battery cell and an inclined lower surface extending from a bottom surface of the at least one battery cell, and wherein the inclined lower surface of the at least one battery cell contacts the inclined upper surface of a lower frame cartridge and the inclined upper surface of the at least one battery cell contacts the inclined lower surface of an upper frame cartridge.

20. The frame cartridge assembly according to claim 19, further comprising a first cell support member between the inclined lower surface of the at least one battery cell and the inclined upper surface of a lower frame cartridge and a second cell support member between the inclined upper surface of the at least one battery cell and the inclined lower surface of an upper frame cartridge.

* * * * *